US008718660B2

(12) United States Patent
Chang et al.

(10) Patent No.: US 8,718,660 B2
(45) Date of Patent: May 6, 2014

(54) APPARATUS FOR MEASURING RADIO ENVIRONMENT OF BASE STATION AND METHOD FOR MEASURING THE SAME

(75) Inventors: Sung Cheol Chang, Daejeon (KR); Hyun-Jae Kim, Incheon (KR); Won-Ik Kim, Daejeon (KR); Sung Kyung Kim, Daejoen (KR); Chul Sik Yoon, Seoul (KR); Jee Hwan Ahn, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 425 days.

(21) Appl. No.: 12/906,587

(22) Filed: Oct. 18, 2010

(65) Prior Publication Data
US 2011/0092235 A1 Apr. 21, 2011

(30) Foreign Application Priority Data

Oct. 19, 2009 (KR) .......................... 10-2009-0099390
Oct. 12, 2010 (KR) .......................... 10-2010-0099413

(51) Int. Cl.
*H04W 72/00* (2009.01)
(52) U.S. Cl.
USPC ........ 455/450; 455/451; 455/452.1; 455/135; 455/454; 455/226.1; 455/63.1; 455/67.11; 455/464; 455/161.3; 455/226.3; 370/442; 370/330; 370/443; 370/444; 370/331
(58) Field of Classification Search
CPC ...... H04W 72/00; H04W 24/00; H04B 17/00; H04B 7/00
USPC .................. 455/67.11, 63.1, 134, 135, 161.3, 455/226.1, 226.2, 226.3, 33, 450, 426.1, 62, 455/562.1, 436, 451, 452.1–454, 464; 370/330, 331, 493, 494, 95, 328, 335, 370/572, 320, 342, 442, 443, 444
See application file for complete search history.

(56) References Cited

U.S. PATENT DOCUMENTS

| 4,485,486 | A | * | 11/1984 | Webb et al. | 455/450 |
|---|---|---|---|---|---|
| 4,866,710 | A | * | 9/1989 | Schaeffer | 370/330 |
| 5,491,837 | A | * | 2/1996 | Haartsen | 455/62 |
| 6,157,845 | A | * | 12/2000 | Henry et al. | 455/426.1 |
| 6,741,578 | B1 | * | 5/2004 | Moon et al. | 370/335 |
| 7,412,265 | B2 | * | 8/2008 | Chen et al. | 455/574 |
| 2003/0193915 | A1 | * | 10/2003 | Lee et al. | 370/335 |
| 2009/0147733 | A1 | * | 6/2009 | Choi et al. | 370/328 |
| 2009/0232089 | A1 | * | 9/2009 | Lott | 370/331 |
| 2012/0230240 | A1 | * | 9/2012 | Nebat et al. | 370/312 |

* cited by examiner

*Primary Examiner* — Edward F. Urban
*Assistant Examiner* — Ganiyu A Hanidu
(74) *Attorney, Agent, or Firm* — Jefferson IP Law, LLP

(57) ABSTRACT

A method and apparatus for measuring a radio environment of a base station is provided. The method includes respectively selecting one or more frames for measuring a radio environment in a first mode in which an Over-The-Air Receiver (OTAR) of the base station is initialized and a second mode in which the OTAR is active, continuously measuring the radio environment based on the selected one or more frames in the first mode and intermittently measuring the radio environment based on the selected one or more frames in the second mode.

19 Claims, 13 Drawing Sheets

FIG. 5

| Preamble index | 0 | 1 | 2 | ··· | 112 | 113 |
| Preamble number | 0 | 1 | 2 | ··· | 112 | 113 |

FIG. 6

|  | 0 | 1 | 2 | ··· | 30 | 31 |  |  |  |  |  |  |
|---|---|---|---|---|---|---|---|---|---|---|---|---|
| Preamble index | 32 | 33 | 34 | ··· | 64 | 65 |  |  |  |  |  |  |
|  | 66 | 67 | 68 | ··· | 94 | 95 | 96 | 97 | ··· | 112 | 113 |  |

| Preamble number | 0 | 1 | 2 | ··· | 30 | 31 | 32 | 33 | ··· | 48 | 49 |
|---|---|---|---|---|---|---|---|---|---|---|---|

FIG. 7

| | | | | | | |
|---|---|---|---|---|---|---|
| Base station | 0 | 1 | 2 | · · · | 98 | 99 |
| Frame number | 0 | 1 | 2 | · · · | 98 | 99 |

FIG. 8

```
                      0   1   2   · · ·   48  49
      Base station   50  51  52   · · ·   98  99

Frame number  | 0 | 1 | 2 |  · · ·  | 48 | 49 |
```

APPARATUS FOR MEASURING RADIO ENVIRONMENT OF BASE STATION AND METHOD FOR MEASURING THE SAME

PRIORITY

This application claims the benefit under 35 U.S.C. §119(a) of a Korean patent application filed on Oct. 19, 2009 in the Korean Intellectual Property Office and assigned Serial No. 10-2009-0099390 and a Korean patent application filed on Oct. 12, 2010 in the Korean Intellectual Property Office and assigned Serial No. 10-2010-0099413, the entire disclosures of each of which are hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd. and 2) the Electronics and Telecommunications Research Institute (ETRI).

BACKGROUND OF THE INVENTION

1. Field of the Invention

The present invention relates to an apparatus and method for use in a mobile communication system. More particularly, the present invention relates to an apparatus and method for measuring a radio environment of a base station in a mobile communication system.

2. Description of the Related Art

In a typical mobile communication system, base stations are fixed and arranged in a planned manner based on a radio environment. These base stations are connected to a backbone network to exchange information with neighboring base stations.

However, a radio environment including a moving base station has difficulty in arranging base stations in a planned manner. In such mobile communication systems, the radio environment is variable, and there may be no connection for exchanging information between base stations. Accordingly, there is a need for a technology for autonomously managing the operational conditions of radio resources, taking into consideration a situation where a base station moves or stops and an environment where a base station may or may not be connected to a backbone network.

The above information disclosed in this Background section is only for enhancement of understanding of the background of the invention and therefore it may contain information that does not form the prior art that is already known in this country to a person of ordinary skill in the art.

SUMMARY OF THE INVENTION

An aspect of the present invention is to address at least the above-mentioned problems and/or disadvantages and to provide at least the advantages described below. Accordingly, an aspect of the present invention is to provide an apparatus for measuring a radio environment of a base station, which measures the radio environment in order to configure radio resources, and a method for measuring the same.

In accordance with an aspect of the present invention, a method for measuring a radio environment of a base station is provided. The method includes respectively selecting frames for measuring a radio environment in a first mode in which an Over-The-Air Receiver (OTAR) of the base station is initialized and a second mode in which the OTAR is active, continuously measuring the radio environment based on the selected one or more frames in the first mode, and intermittently measuring the radio environment based on the selected one or more frames in the second mode.

In accordance with another aspect of the present invention, an apparatus for measuring a radio environment of a base station is provided. The apparatus includes a signal receiving unit for receiving signals from neighboring base stations, a frame scheduling unit for respectively selecting one or more frames for measuring a radio environment in a first mode that an OTAR of the base station is initialized and a second mode that the OTAR is active, and a radio environment measurement unit for continuously measuring the radio environment in the first mode based on the selected one or more frames in the first mode and intermittently measuring the radio environment in the second mode based on the selected one or more frames in the second mode.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 5 and 6 are views showing a frame scheduling method using a resource scheme according to exemplary embodiments of the present invention.

FIGS. 7 and 8 are views showing a frame scheduling method using a priority scheme according to exemplary embodiments of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope or spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, unless explicitly described to the contrary, the word "comprise" and variations such as "comprises" or "comprising" will be understood to imply the inclusion of stated elements but not the exclusion of other elements not mentioned.

As used herein, the term 'terminal' may refer to a Mobile Station (MS), a Mobile Terminal (MT), a Subscriber Station (SS), a Portable Subscriber Station (PSS), User Equipment (UE), an Access Terminal (AT), etc., and may include the entire or partial functions of the MS, the MT, the SS, the PSS, the UE, the AT, etc.

As used herein, the term 'base station' may refer to a Radio Access Station (RAS), a Node B, an evolved Node B (eNodeB), a Base Transceiver Station (BTS), a Mobile Multihop Relay (MMR)-BS, etc., and may include the entire or partial functions of the RAS, the node B, the eNodeB, the BTS, the MMR-BS, etc.

A method and apparatus for measuring a radio environment of a base station according to one exemplary embodiment of the present invention is described below with reference to the accompanying drawings.

Figure 1:
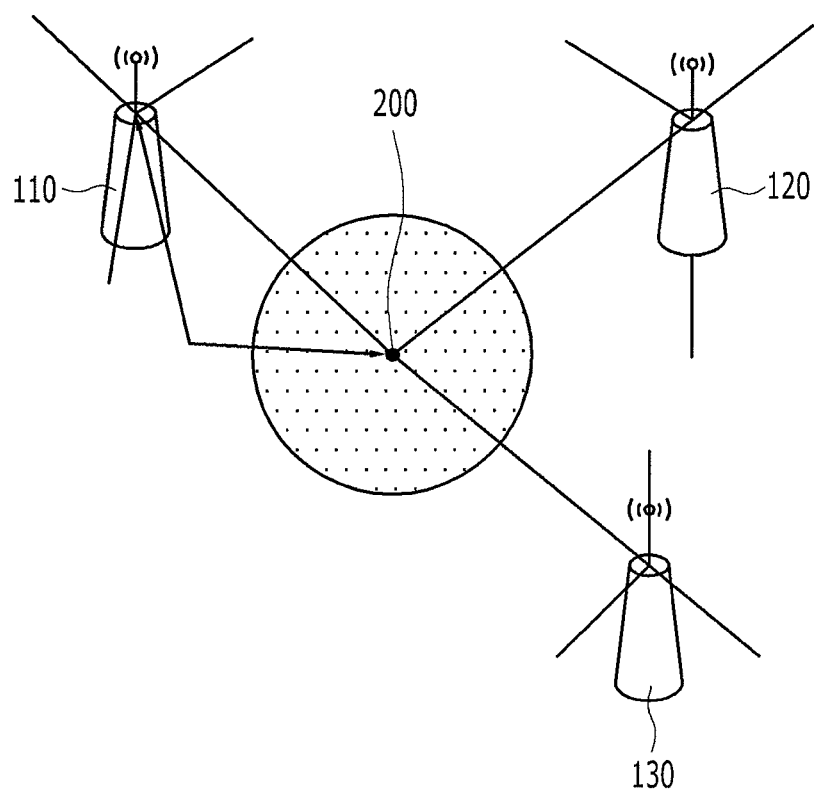
FIG. 1 is a view schematically showing a mobile communication system according to an exemplary embodiment of the present invention.

FIG. 1 is a view schematically showing a mobile communication system according to an exemplary embodiment of the present invention.

Referring to FIG. 1, the mobile communication system includes a plurality of base stations 110, 120, and 130. Each of the base stations 110, 120, and 130 provides mobile communication services by transmitting radio signals to and receiving from a terminal (not shown) existing in a certain peripheral area, i.e., a cell. Each of the base stations 110, 120, and 130 may be mobile.

A base station according to an exemplary embodiment of the present invention is located at the location 200, and receives signals of the neighboring base stations 110, 120, and 130 to acquire information on its radio environment. The base station 200 may also be mobile.

The base station 200 is able to receive signals from the neighboring base stations 110, 120, and 130 by using an Over-The-Air Receiver (OTAR) function, which is a technology for self-configuration of a base station. While the base station 200 performs the OTAR function, the base station 200 can measure the radio environment by receiving a radio signal from the base stations 110, 120, and 130 as if it were a terminal. The received radio signal includes a preamble signal.

Figure 2:
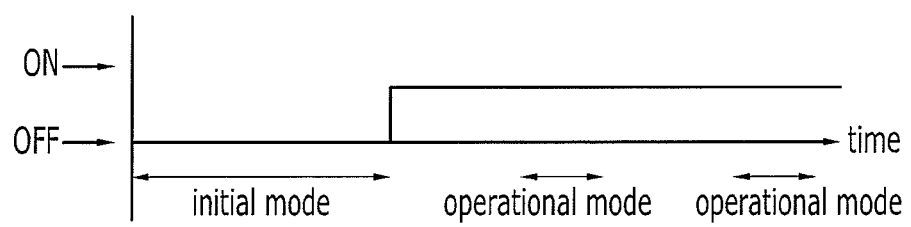
FIG. 2 is a view showing a method in which a base station performs an Over-The-Air Receiver (OTAR) function according to an exemplary embodiment of the present invention.

FIG. 2 is a view showing a method in which a base station performs the OTAR function according to an exemplary embodiment of the present invention.

Referring to FIG. 2, the OTAR function for the base station 200 includes an initial mode and an operational mode. In the initial mode of the OTAR, the base station 200 initializes radios and measures the radio environment using received signals. In the operational mode of the OTAR, the base station 200 activates radios and periodically measures the radio environment.

The base station 200 transmits a downlink signal to a terminal, and receives an uplink signal from the terminal. The terminal can measure a channel state using the downlink signal received from the base station 200. The base station 200 is able to efficiently operate radio resources using the channel state reported from the terminal. However, if the radio environment of the base station 200 is variable, or the base station 200 is not connected by a backbone network, the base station 200 can measure the radio environment of the base station 200 based on signals received from the neighboring base stations 110, 120, and 130. To this end, the base station 200 should not transmit a signal and should measure signals of the neighboring base stations 110, 120, and 130 while the neighboring base stations 110, 120, and 130 are transmitting signals. The strength of the signal transmitted from the base station 120 is greater than the strength of the signals received from the neighboring base stations 110, 120, and 130. Thus, when the base station 200 and the neighboring base stations 110, 120, and 130 simultaneously receive signals, the base station 200 cannot receive the signals of the neighboring base stations 110, 120, and 130. Accordingly, it is necessary to perform scheduling to prevent the base station 200 and the neighboring base stations 110, 120, and 130 from simultaneously transmitting signals.

Figure 3:
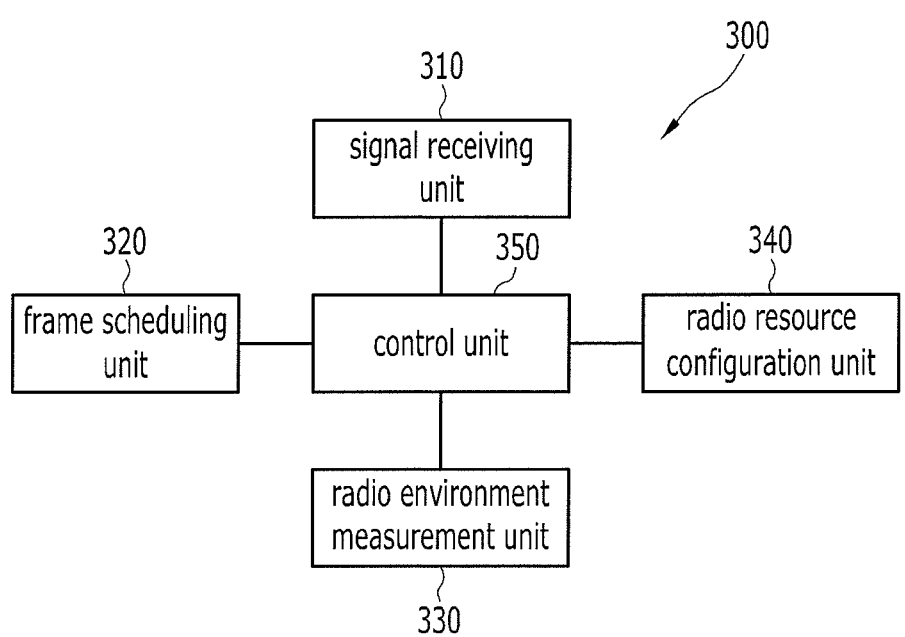
FIG. 3 is a block diagram showing a radio environment measurement apparatus according to an exemplary embodiment of the present invention.
Figure 4:
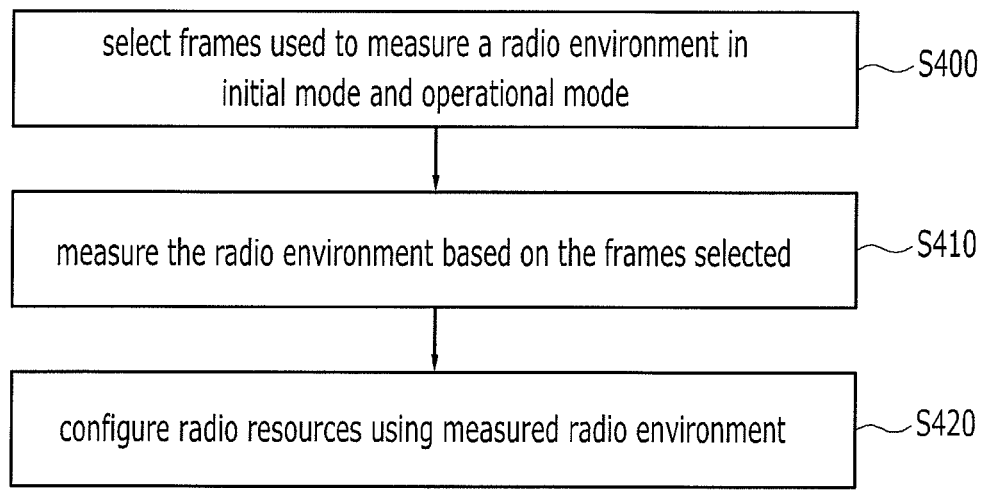
FIG. 4 is a flowchart showing a radio environment measurement method of a radio environment measurement apparatus according to an exemplary embodiment of the present invention.

FIG. 3 is a block diagram showing a radio environment measurement apparatus 300 according to an exemplary embodiment of the present invention, and FIG. 4 is a flowchart showing a radio environment measurement method of a radio environment measurement apparatus 300 according to an exemplary embodiment of the present invention. The radio environment measurement apparatus 300 may be part of the base station 200.

Referring to FIG. 3, the radio environment measurement apparatus 300 includes a radio receiving unit 310, a frame scheduling unit 320, a radio environment measurement unit 330, a radio resource configuration unit 340, and a control unit 350.

The signal receiving unit 310 receives signals for measuring the radio environment. The signal receiving unit 310 can receive signals from terminals connected to the base station 200, or can receive signals from the neighboring base stations 110, 120, and 130.

The frame scheduling unit 320 schedules frames used to measure the radio environment. The frame scheduling unit 320 can select one or more frames in which the base station 200 will not transmit a signal or one or more frames in which the base station 200 will transmit a signal from among a plurality of frames within a given slot.

The radio environment measurement unit 330 measures the radio environment using the signals received through the signal receiving unit 310.

The radio resource configuration unit 340 selects a radio resource according to the radio environment measured by the radio environment measurement unit 340. If the radio environment is variable, the radio resource configuration unit 340 can select a new radio resource.

The control unit 350 controls the overall operation of the radio environment measurement apparatus 300.

Referring to FIGS. 3 and 4, the frame scheduling unit 320 selects one or more frames used to measure a radio environment in step S400. The frame scheduling unit 320 may select all frames within a certain interval for an initial mode operation of the radio environment measurement unit 330. The frame scheduling unit 320 may select frames within a certain interval for an operational mode operation using a certain scheme. The certain scheme may be at least one of an arbitrary scheme for selecting an arbitrary frame, a resource scheme for selecting a frame by resource, and a priority scheme for selecting a frame by base station.

In step S410, the radio environment measurement unit 330 measures the radio environment based on the one or more frames selected in step S400. If the radio environment measurement unit 330 operates in the initial mode, the radio environment measurement unit 330 can measure the radio environment for all frames that the frame scheduling unit 320 selects for the initial mode operation. When a selected radio resource is verified according to the radio environment measured in the initial mode, the radio environment measurement unit 330 transitions to the operational mode. When the radio environment measurement unit 330 operates in the operational mode, the radio environment measurement unit 330 does not transmit. Instead, the radio environment measurement unit 330 only receives signals in the frame that the frame scheduling unit 320 selects for the operational mode. Accordingly, the radio resource measurement unit 320 intermittently measures the radio environment in the operational mode.

The radio resource configuration unit 340 configures radio resources based on the radio environment measured in step S410. If there is a change in the radio environment, the radio resource configuration unit 340 can set up a new radio resource. A radio resource may be, for example, a frequency band or a preamble index.

Hereinafter, the radio environment measurement apparatus and radio environment measurement method illustrated in FIGS. 3 and 4 is described is further detail below.

Exemplary Embodiment 1

Frame Scheduling

Frame scheduling schemes for an operational mode of the radio environment measurement apparatus may includes an arbitrary scheme, a resource scheme, and a priority scheme. The base station 200 can define a plurality of frames as one pattern slot, and can select one or more of the frames within the pattern slot.

According to the arbitrary scheme, the base station 200 arbitrarily selects a frame. The base station 200 can select one frame every predefined period of time. If the number of base stations 200 is large, there is a probability that different base stations may select the same frame. Therefore, the arbitrary scheme can be applied when the number of base stations 200 is small.

Next, according to the resource scheme, the base station 200 selects a frame by radio resource, for example, a Preamble Index (PI). That is, the base station 200 can select a frame allocated per preamble index. For example, 114 preamble indexes 0-113 can be taken into account in 1024 FFT. At this point, one frame may be allocated to one preamble index, or one frame may be allocated to multiple preamble indexes.

FIGS. 5 and 6 are views showing a frame scheduling method using a resource scheme according to exemplary embodiments of the present invention.

Referring to FIG. 5, if the number of preamble indexes and the number of frames constituting a given slot are the same, a different frame may be selected for each preamble index.

Referring to FIG. 6, if the number of frames constituting a given slot is less than the number of preamble indexes, the same frame may be selected for the plurality of preamble indexes. To this end, the base station may further use sector resources.

That is, if the base station consists of a plurality of sectors, for example, three sectors, different antennas may be used for the different sectors, and, if the base station consists of one sector, an omni antenna may be used. At this point, each base station has one cell ID (hereinafter referred to as an IDCell), and each section may have a different slot ID. Also, if a base station uses different antennas for different sectors, a preamble index may be allocated to each sector. For example, if 0-th to 95-th preamble indexes are allocated to 32 base stations, the preamble indexes allocated to each sector of the base station of IDCell 0 may be 0, 32, and 64, and the preamble indexes allocated to each of the base station of IDCell 31 may be 31, 63, and 95.

For frame scheduling, the base station 200 selects a representative preamble index from among the plurality of preamble indexes allocated to each ID Cell, and schedules frames with respect to the representative preamble index. Here, the representative preamble index may be selected according to a fixed rule or arbitrarily. The fixed rule may be, for example, a result of IDCell mod 3. In this manner, when different sectors are selected for different IDCells, a dispersion effect can be obtained.

For example, if it is assumed that there are 50 frames, 32 IDCells are allocated to base stations each using sector antennas, and 18 IDCells are allocated to base stations each using an omni antenna. The base station may perform frame scheduling for the 32 frames by using the representative preamble index allocated to each IDCell, and may perform frame scheduling for the remaining 18 frames by using the IDCells for the base stations each using an omni-antenna.

Meanwhile, according to the priority scheme, the base station 200 selects a frame by base station. FIGS. 7 and 8 are views showing a frame scheduling method using a priority scheme according to exemplary embodiments of the present invention.

Referring to FIG. 7, if the number of base stations and the number of frames constituting a given slot are the same, a different frame may be selected for each base station.

Referring to FIG. 8, if the number of frames constituting a given slot is less than the number of preamble indexes, the same frame may be selected for the plurality of base stations.

As explained above, the base station 200 may use at least one of the arbitrary scheme, the resource scheme, and the priority scheme in order to perform frame scheduling. Meanwhile, a single pattern scheme and a multi-pattern scheme may be used depending on whether the base station 200 performs frame scheduling over a given slot by using only one scheme.

According to the single pattern scheme, the base station 200 selects only one of the arbitrary scheme, the resource scheme, and the priority scheme, and performs frame scheduling over a given slot. If the number of base stations operated by a network is limited, and frame scheduling is performed using the priority scheme alone to avoid conflict with other base stations, it is advantageous to employ the single pattern scheme.

Figure 9:
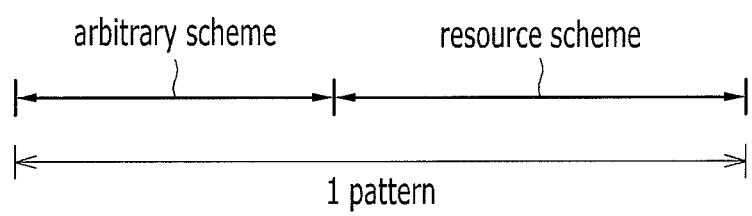
FIGS. 9 to 11 are views showing a multi-pattern scheme according to exemplary embodiments of the present invention.
Figure 10:
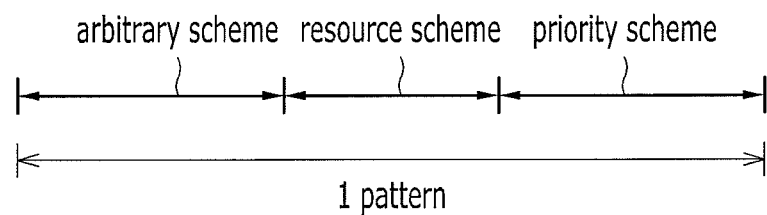
Figure 11:
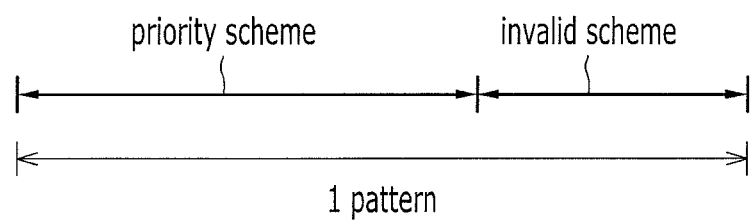

According to the multi-pattern scheme, the base station 200 selects two or more of the arbitrary scheme, the resource scheme, and the priority scheme, and performs frame scheduling over a given slot. By employing the multi-pattern scheme, the drawbacks of each scheme can be compensated. FIGS. 9 to 11 are views showing a multi-pattern scheme according to exemplary embodiments of the present invention.

Referring to FIG. 9, scheduling of frames of a given slot is performed using the arbitrary scheme and the resource scheme. When frame scheduling is performed according to the resource scheme, the same frame can be selected for multiple base stations. To compensate for this drawback, frame scheduling may be performed on part of a given slot according to the arbitrary scheme, and may be performed on the remaining part thereof according to the resource scheme.

Referring to FIG. 10, scheduling of frames of a given slot is performed using the arbitrary scheme, the resource scheme, and the priority scheme. When frame scheduling is performed according to the priority scheme, the same frame can be selected for multiple base stations, and interference may occur when the multiple base stations simultaneously transmit signals. Therefore, the probability of interference between the base stations can be reduced by performing frame scheduling within a given slot by using a combination of the arbitrary scheme, the resource scheme, and the priority scheme.

Referring to FIG. 11, while frame scheduling of part of a given slot is performed using the priority scheme, the remaining part of the slot may be defined as an invalid slot. An invalid slot denotes a frame that no base station selects, and may be used to set the cycle of frame scheduling to a constant value.

As described above, the base station 200 can select a frame by performing frame scheduling, and can measure the radio environment by not transmitting but only receiving signals from the selected frame. Meanwhile, the base station can measure the radio environment using the OTAR function. OTAR includes an initial point of time and an operational point of time. The initial point of time and operational point of time of the OTAR may be operated based on the frame selected by frame scheduling. Hereinafter, a method for measuring a radio environment depending on the initial point of time and operational point of time of the OTAR will be described.

Exemplary Embodiment 2

Initial Mode of OTAR

Figure 12:
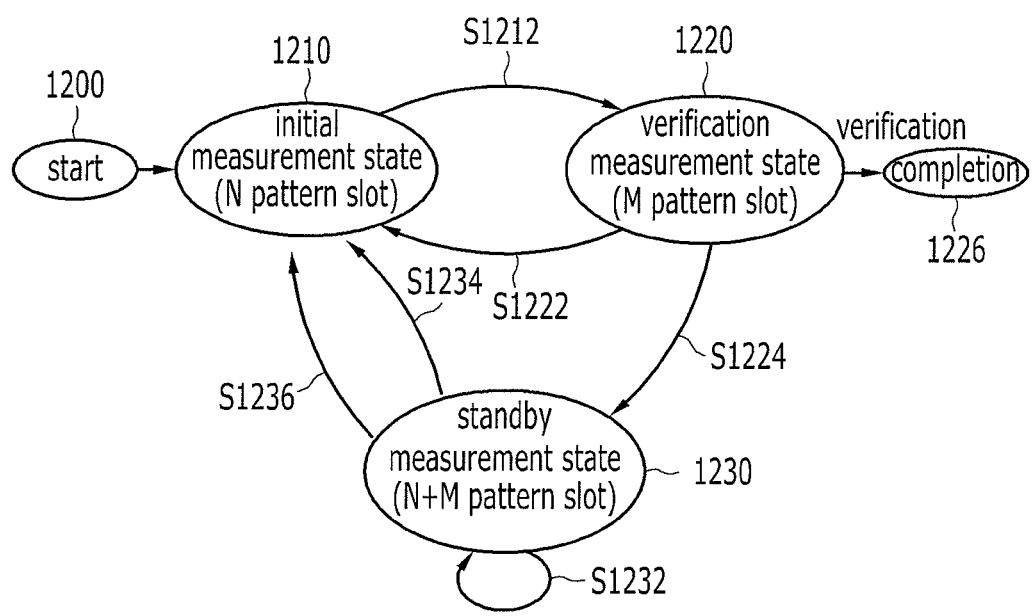
FIG. 12 shows a state diagram of a base station in the initial mode of an OTAR according to an exemplary embodiment of the present invention.

The base station 200 receives signals from the neighboring base stations 110, 120, and 130 in the initial mode of the OTAR. FIG. 12 shows a state diagram of a base station in the initial mode of the OTAR according to an exemplary embodiment of the present invention. It is assumed that the initial mode of the OTAR is performed in synchronization with a cycle of an (N+M) pattern, and the starting frame of the (N+M) pattern is fixed.

Referring to FIG. 12, the base station 200 starts the initial mode 1200 of the OTAR. In an initial measurement state 1210 defined as an N pattern, the base station 200 measures the radio environment. At this time, the base station 200 measures the radio environment for each frame regardless of a result of frame scheduling. For example, the base station 200 can measure the radio environment for each frame in such a manner so as to calculate the received signal strength of all preamble indexes. Also, the base station 200 measures the radio environment of all frequency bands in use. It is assumed that a given slot for which the base station 200 can measure the radio environment of one frequency band is 1 pattern. If the base station 200 uses three frequency bands and is able to measure the radio environment of one frequency band at a time, at least 3 patterns of a slot for measuring the initial measurement state are allocated to the base station 200. If the base station 200 uses three frequency bands and is able to measure the radio environment of three frequency bands simultaneously, at least 1 pattern of a slot for measuring in the initial measurement state 1210 is allocated to the base station 200.

Meanwhile, the base station 200 can store a radio environment measurement value based on the frequency band and preamble index measured in the initial measurement state 1210. The radio environment measurement value may be, for example, at least one of a Receiver Signal Strength Indicator (RSSI), a Carrier-to-Interference-and-Noise Ratio (CINR), and a time delay. The base station 200 may extract an effective value by filtering the measured values, and may store the effective value alone.

On the basis of a measurement result of the radio environment, a base station selects a radio resource. The base station may select a radio resource using information on the radio resource exchanged via a backbone network. The radio resource is, for example, a preamble index or a frequency band.

Next, the base station 200 transitions to a verification measurement state 1220 in step S1212. In the verification measurement state 1220 defined as an M pattern, the base station 200 verifies the selected radio resource. To this end, the base station 200 activates the selected radio resource during the M pattern. A slot within an activated frame includes a preamble area, but is not allocated an uplink resource.

Meanwhile, the base station 200 does not activate the radio resource in a frame selected by frame scheduling, but measures the radio environment by performing the OTAR function. At this point, the base station 200 can measure the radio environment of all frequency bands in use, or measure the radio environment of some frequency bands.

Further, in the verification measurement state 1220, the base station 200 can perform the OTAR function in order to measure the effects of the neighboring interfering base stations. For example, if the number of frames selected by each base station within 1 pattern is two, and 8 frames are required for verification measurement, the base station 200 can perform verification measurement using the OTAR function during at least 4 patterns.

Upon completion of verification of the radio resource selected by the base station 200, the base station completes the initial mode 1226 of the OTAR, and is normally operated using the selected radio resource. If a new preamble index is not added or the same radio resource is not selected in a radio resource selection process performed using a new preamble index, it is determined that the base station 200 has completed verification.

In the verification measurement state 1220, if the base station 200 predicts interference avoidance, it transitions to the initial measurement state 1210 in step S1222, or if the base station 200 does not complete verification or predicts interference, it transitions to a standby measurement state 1230 in step S1224. For example, if the same radio resource is not selected in a radio resource selection process performed using a new preamble index, the base station 200 assumes that interference has occurred in the initial mode of the OTAR and transitions to the standby measurement state 1230.

In the standby measurement state 1230, the base station 200 waits for a period in which interference can be avoided. Interference avoidance schemes for the base station 200 include, for example, a probabilistic avoidance scheme and an interference avoidance prediction scheme.

According to the probabilistic avoidance scheme, the base station 200 estimates the number of interfering base stations using the preamble index added in the verification measurement state 1220 of the M pattern, and if the number of interfering base stations is two or more, an avoidance slot is defined probabilistically. The avoidance slot may be at least one (N+M) pattern. For example, if the avoidance slot is defined as two (N+M) patterns, the base station 200 waits for 2*(N+M) patterns in the standby measurement state 1230 in step 1232, and then transitions to the initial measurement state 1210 in step S1234.

According to the interference avoidance prediction scheme, the base station 200 recognizes base stations interfering in the corresponding frame, and calculates the priority of the base stations. Interference avoidance is predicted for the base stations with highest priority, and interference is predicted for the remaining base stations. The base station for which interference avoidance is predicted maintains the standby measurement state 1230 during a predicted period of time in which interference can be avoided The base stations for which interference is predicted transition to the initial measurement state 1210 in step S1236. A detailed description of the interference avoidance prediction scheme will be given later.

Figure 13:
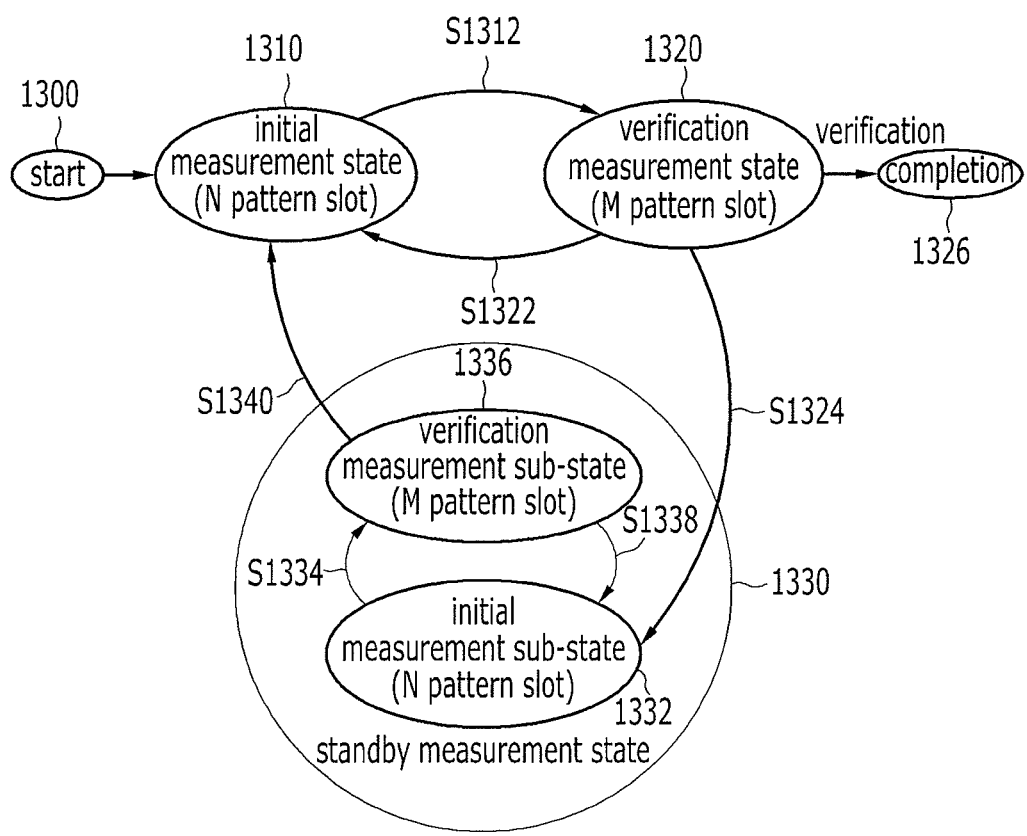
FIG. 13 shows a state diagram of a base station when an interference avoidance prediction method is employed in the initial mode of an OTAR according to an exemplary embodiment of the present invention.

FIG. 13 shows a state diagram of a base station when an interference avoidance prediction method is employed in the initial mode of the OTAR according to an exemplary embodiment of the present invention. Description of FIG. 13 that is redundant with the description of FIG. 12 will be omitted. For example, elements 1300, 1310, S1312, 1320, S1322, and 1326 of FIG. 13 are similar to elements 1200, 1210, S1212, 1220, S1222, and 1226 of FIG. 12, respectively, and thus their description may be omitted.

Referring to FIG. 13, the standby measurement state includes a verification measurement sub-state defined as an M pattern and an initial measurement sub-state defined as an N pattern. In the verification measurement state in step S1320, a base station for which interference is predicted transitions to the initial measurement sub-state 1332 of the standby measurement state 1330 in step S1324. In the initial measurement sub-state 1332, a priority list of the base stations is configured. The priority list may be set according to frame scheduling using the priority scheme of base stations. In the initial measurement sub-state 1332, the base station continuously measures a radio environment during an N pattern. Afterwards, the base station transitions to the verification measurement sub-state 1336 in step S1334. In the verification measurement sub-state 1336, the base station continuously measures the radio environment during an M pattern, and then updates the priority list. For example, if a new base station is detected, the base station predicts interference and updates the priority list. Interference avoidance is predicted for the base station with highest priority, and interference is predicted for the remaining base stations. The base station for which interference avoidance is predicted transitions to the initial measurement state 1310 in step S1340. The base stations for which interference avoidance is predicted transitions to the initial measurement sub-state 1332 in step S1338.

For example, it is assumed, in initial measurement state 1332, that interference between base station 1 and base station 2 is predicted, and that base station 1 is allocated the 10-th frame and base station 2 is allocated the 14-th frame according to the frame scheduling using the priority scheme. As the priority of base station 1 is higher than the priority of base station 2, interference avoidance is predicted for base station 1 and interference is predicted for base station 2. Accordingly, base station 1 transitions to the initial measurement state 1310, and base station 2 transitions to the initial measurement sub-state 1332. Afterwards, base station 2 measures the radio environment during an M pattern in the verification measurement sub-state 1336. If a new base station is not detected, base station 2 deletes base station 1 from the priority list and transitions to the initial measurement state 1310. In contrast, if a new base station, i.e., base station 3, is detected, base station 2 deletes base station 1 from the priority list and adds base station 3. If the priority of base station 3 is lower than the priority of base station 2, base station 3 transitions to the initial measurement state 1310.

Exemplary Embodiment 3

Operational Point of Time OTAR

After a radio resource is activated, the base station is operated in the operational mode of the OTAR. At this point, the same pattern and frame scheduling used in the initial mode of the OTAR may be used.

The base station does not transmit but receives signals from a frame selected by frame scheduling, and measures the radio environment using the received signals. That is, the base station intermittently measures the radio environment in the operational mode of the OTAR.

The radio environment measured by the base station may be measured based on, for example, at least one of RSSI information, CINR information, and time delay information.

The base station can measure the radio environment of all frequency bands in use, sector resources, preamble indexes, and sector resources for each preamble index. If the base station uses three frequency bands and is able to measure the radio environment of one frequency band at a time, the radio environment of each frequency band can be measured using a slot 3 times longer than the number of patterns required per frequency band. If the base station can measure the radio environment of three frequency bands simultaneously, the radio environment of each frequency band can be simultaneously measured using a slot corresponding to the number of patterns required per frequency band.

The base station can configure radio resources by taking a changing radio environment into account, and can efficiently manage the radio resources. More particularly, by performing scheduling for preventing a plurality of base stations from simultaneously transmitting signals, it is possible to avoid interference between the base stations and efficiently measure the radio environment.

The exemplary embodiments of the present invention are not implemented only by a device and/or method, but can be implemented through a program for realizing functions corresponding to the configuration of the exemplary embodiment of the present invention and a recording medium having the program recorded thereon.

While this invention has been described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for measuring a radio environment of a base station, the method comprising:
   selecting all frames within a predetermined interval for measuring a radio environment in a first mode in which an Over-The-Air Receiver (OTAR) of the base station is initialized;
   intermittently selecting one or more frames within the predetermined interval for measuring the radio environment in a second mode in which the OTAR is active according to at least one of a first scheme for selecting an arbitrary frame, a second scheme for selecting a frame by resources, and a third scheme for selecting a frame by base station;
   continuously measuring the radio environment based on the selected all frames in the first mode; and
   intermittently measuring the radio environment based on the selected one or more frames in the second mode.

2. The method of claim 1, wherein the resource comprises at least one of a preamble index resource and a sector resource.

3. The method of claim 2, wherein in the first scheme for selecting an arbitrary frame, a frame is selected arbitrarily or periodically after a predefined time period.

4. The method of claim 2, wherein in the second scheme for selecting a frame by resources, a frame allocated per preamble index is selected, wherein if the number of preamble indexes and the number of frames constituting a given slot are the same, a different frame may be selected for each preamble index, and, if the number of frames constituting a given slot is less than the number of preamble indexes, the same frame may be selected for the plurality of preamble indexes.

5. The method of claim 2, wherein in the third scheme for selecting a frame by base station, if a number of base stations and the number of frames constituting a given slot are the same, a different frame may be selected for each base station, and if the number of frames constituting a given slot is less than the number of preamble indexes, the same frame may be selected for the base stations.

6. The method of claim 1, wherein the continuously measuring comprises:
   extracting, for each frame, at least one of Receiver Signal Strength Indicator (RSSI) information, Carrier-To-Interference-and-Noise Ratio (CINR) information, and time delay information;
   selecting a radio resource based on the extracted information;
   verifying the selected radio resource; and
   transitioning to the second mode.

7. The method of claim 6, wherein the continuously measuring further comprises, when verifying the selected radio resource, if it is determined that interference has occurred, waiting for a predefined period of time.

8. The method of claim 7, wherein the waiting comprises:
   estimating the number of interfering base stations;
   probabilistically defining an avoidance slot based on the estimated number; and
   waiting for the avoidance slot.

9. The method of claim 8, wherein the waiting comprises:
   setting the priority of the interfering base stations;
   predicting interference or interference avoidance for the base stations based on the priority; and
   if interference is predicted for the base stations, waiting for the predefined period of time.

10. The method of claim 1, wherein the intermittently measuring comprises measuring the radio environment by receiving signals from the selected frame.

11. The method of claim 10, wherein the radio environment is measured based on Receiver Signal Strength Indicator (RSSI) information, Carrier-to-Interference-and-Noise Ratio (CINR) information, and time delay information.

12. The method of claim 10, wherein the radio environment is measured for each frequency band or for each preamble index.

13. An apparatus for measuring a radio environment of a base station, the apparatus comprising:
   a signal receiving unit for receiving signals from neighboring base stations;
   a frame scheduling unit for selecting all frames within a predetermined interval for measuring a radio environment in a first mode in which an Over-The-Air Receiver (OTAR) of the base station is initialized and intermittently selecting one or more frames within the predetermined interval for measuring a radio environment in a second mode in which the OTAR is active according to at least one of a first scheme for selecting an arbitrary frame, a second scheme for selecting a frame by resources, and a third scheme for selecting a frame by base station; and
   a radio environment measurement unit for continuously measuring the radio environment in the first mode based on the selected all frames in the first mode, and for intermittently measuring the radio environment in the second mode based on the selected one or more frames in the second mode.

14. The apparatus of claim 13, wherein, when a selected radio resource is verified according to the radio environment measured in the first mode, the radio environment measurement unit is operated in the second mode.

15. The apparatus of claim 13, wherein, when operating in the second mode, the radio environment measurement unit does not transmit a signal in the one or more frames for measuring the radio environment in the second mode.

16. The apparatus of claim 13, wherein the radio environment measurement unit measures the radio environment based on Receiver Signal Strength Indicator (RSSI) information, Carrier-To-Interference-and-Noise Ratio (CINR) information, and time delay information.

17. The apparatus of claim 13, wherein the radio environment measurement unit measures the radio environment for each frequency band or the radio environment for each preamble index.

18. The method of claim 1, wherein the one or more frames intermittently selected for measuring the radio environment in the second mode are selected according to one of a single pattern scheme and a multi-pattern scheme based at least in part on a number of base stations operated by a network within which the base station operates.

19. The apparatus of claim 13, wherein the frame scheduling unit intermittently selects the one or more frames for measuring the radio environment in the second mode according to one of a single pattern scheme and a multi-pattern scheme based at least in part on a number of base stations operated by a network within which the base station operates.

* * * * *